(12) United States Patent
Becker et al.

(10) Patent No.: US 7,699,146 B1
(45) Date of Patent: Apr. 20, 2010

(54) SUSPENSION DAMPER HAVING INERTIA VALVE AND USER ADJUSTABLE PRESSURE-RELIEF

(75) Inventors: William Becker, Aptos, CA (US); Robert C. Fox, Los Gatos, CA (US); Dennis K. Wootten, Scotts Valley, CA (US)

(73) Assignee: Fox Factory, Inc., Watsonville, CA (US)

( * ) Notice: Subject to any disclaimer, the term of this patent is extended or adjusted under 35 U.S.C. 154(b) by 589 days.

(21) Appl. No.: 11/535,552

(22) Filed: Sep. 27, 2006

Related U.S. Application Data

(60) Provisional application No. 60/744,128, filed on Apr. 2, 2006.

(51) Int. Cl.
*F16F 9/504* (2006.01)
*F16F 9/06* (2006.01)

(52) U.S. Cl. .................. 188/275; 188/315; 188/318

(58) Field of Classification Search .................. 188/275, 188/314, 315, 318, 319.1, 319.2
See application file for complete search history.

(56) References Cited

U.S. PATENT DOCUMENTS

| | | | | |
|---|---|---|---|---|
| 1,818,141 | A | * | 8/1931 | Lang .......................... 188/275 |
| 1,953,178 | A | * | 4/1934 | Kindl et al. .................. 188/275 |
| RE21,067 | E | * | 5/1939 | Kindl .......................... 188/275 |
| 4,076,276 | A | * | 2/1978 | Wijnhoven et al. .......... 188/315 |
| 5,275,264 | A | * | 1/1994 | Isella ....................... 188/319.2 |
| 5,423,402 | A | * | 6/1995 | de Kock ...................... 188/275 |
| 5,462,140 | A | * | 10/1995 | Cazort et al. ................. 188/275 |
| 5,542,509 | A | * | 8/1996 | Bell ............................ 188/315 |
| 5,598,903 | A | * | 2/1997 | Richardson ................. 188/275 |
| 6,086,060 | A | * | 7/2000 | Berthold ................... 267/64.15 |
| 6,592,136 | B2 | | 7/2003 | Becker et al. |
| 6,659,241 | B2 | * | 12/2003 | Sendrea ....................... 188/314 |
| 7,163,223 | B2 | * | 1/2007 | Wesling et al. ........... 188/319.2 |
| 2003/0213662 | A1 | * | 11/2003 | Fox .............................. 188/275 |

OTHER PUBLICATIONS

U.S. Appl. No. 11/291,058, filed Nov. 29, 2005, Becker.

* cited by examiner

*Primary Examiner*—Thomas J Williams
(74) *Attorney, Agent, or Firm*—Patterson & Sheridan, L.L.P.; David M. Haugen

(57) ABSTRACT

A modern suspension damper, for example, a shock absorber or a suspension fork, including an inertia valve and a pressure-relief feature is disclosed. The pressure-relief feature includes a rotatable adjustment knob that allows the pressure-relief threshold to be externally adjusted by the rider "on-the-fly" and without the use of tools.

19 Claims, 12 Drawing Sheets

SUSPENSION DAMPER HAVING INERTIA VALVE AND USER ADJUSTABLE PRESSURE-RELIEF

RELATED PATENTS AND APPLICATIONS

This application is related to Assignee's co-pending patent application, entitled: Bicycle Fork Having Lock-out, Blow-off, and Adjustable Blow-off Threshold, U.S. Ser. No. 10/620,323 filed Jul. 15, 2003, which is a continuation of Assignee's U.S. Pat. No. 6,592,136 (hereinafter the '136 patent).

This application is also related to Assignee's co-pending patent applications, entitled: Inertia Valve Shock Absorber, U.S. Ser. No. 10/778,882, filed Feb. 13, 2004 and Inertia Valve Shock Absorber, U.S. Ser. No. 11/259,629, filed Oct. 26, 2005, both of which are children of Assignee's U.S. Pat. No. 6,581,948 (hereinafter the '948 patent) and U.S. Pat. No. 6,604,751 (hereinafter the '751 patent).

All patents and patent applications referred to herein and especially our earlier '136, '948, and '751 patents are incorporated by reference in their entirety in this patent application.

FIELD OF THE INVENTION

The present invention is generally related to modern suspension dampers, such as shock absorbers and suspension forks used in vehicle suspensions. More particularly, the present invention is related to the field of suspension dampers having an inertia valve and a user adjustable pressure-relief feature.

BACKGROUND OF THE INVENTION

Suspension forks and/or shock absorbers are often utilized on vehicle suspensions, to absorb energy (e.g. bumps) imparted to the wheels by the terrain on which the vehicle is used. When the vehicle is a bicycle, such as a mountain bike or off-road bicycle, the use of a suspension fork and/or shock absorber allows a rider to traverse rougher terrain, at a greater speed and with less fatigue in comparison to riding a rigid bicycle.

In our earlier '136 patent, a suspension fork having an adjustable pressure-relief valve is described. The valve can be adjusted "on-the-fly" and without the use of tools, since a control knob is positioned external to the suspension fork for easy manipulation by the user.

In our earlier '948 and '751 patents, rear shock absorbers and suspension forks having an inertia valve and a pressure-relief valve are described. However, in these two earlier patents, the threshold pressure at which the pressure-relief valve opens is not adjustable without a damper rebuild that involves using tools to replace the pressure-relief shim stack in the damper with another shim stack having a different thickness/spring rate.

Inertia valve dampers having pressure-relief features may have been suggested in the past, see e.g. U.S. Pat. No. 1,818,141 to Lang; U.S. Pat. No. 1,873,133 to Kindl; and U.S. Pat. No. 1,953,178, also to Kindl. However, in dampers such as these, externally adjustable pressure-relief especially for use during the compression stroke does not appear to have been suggested.

Thus, there is room for improvement within the art of suspension dampers, shock absorbers, suspension forks, and bicycle suspensions.

DETAILED DESCRIPTION OF THE INVENTION

Figure 1:
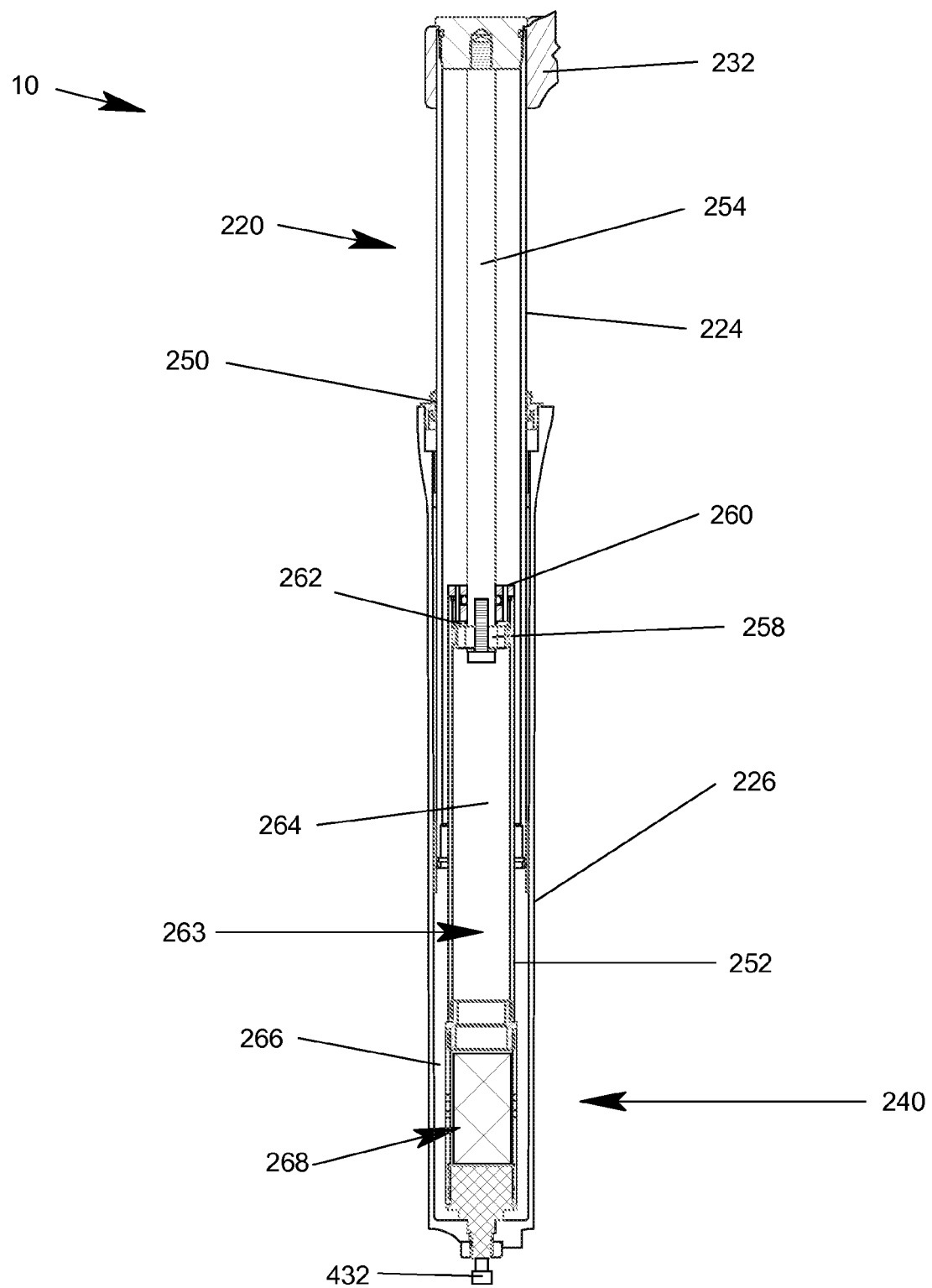
FIG. 1 depicts an overall schematic cross-section view of a leg of a suspension fork according to a first exemplary embodiment of the invention.

Prior to describing the various exemplary embodiments of the invention, it should be noted that suspension dampers according to any of the various exemplary embodiments described herein, while being improvements relative to our earlier patents ('136, '948, and '751), incorporate much of the theory and most basic technology underlying our earlier patents. Accordingly, to maintain the clarity and conciseness of this patent application, where not critical to an understanding of the invention, reference should be made to our earlier '136, '948, and '751 patents, incorporated by reference herein, for a more detailed description of the various background technologies applicable to the invention. The present application will only point out the most important similarities and differences between the suspension dampers of the current invention and those of our earlier patents. Additionally, where possible, reference numerals from the '136, '948 and '751 patents have been carried over to the present application. Furthermore, where a technical feature appears more than once in a FIG, in many instances only one reference numeral is included to prevent clutter. Finally, a table outlining the reference numerals used has been provided to aid cross-reference.

Suspension Forks

General Structure

The various aspects of the current invention may be implemented in different kinds of suspension dampers. In particular, however, the various aspects of the invention are especially suited for implementation in a front suspension fork or a rear shock absorber assembly of a bicycle.

First, the invention will be described with respect to suspension dampers in the exemplary form of front suspension forks.

FIG. 1 depicts an overall schematic cross-section view of a leg 220 of a suspension fork 10 according to a first exemplary embodiment of the invention.

In particular, FIG. 1 depicts a compressible fork leg 220 connected to a fork crown 232 (for connection to a second fork leg—not shown—and that may contain a spring mechanism). Fork leg 220 comprises a hollow upper tube 224 that is capable of telescopic motion in the compression and rebound directions relative to a hollow lower tube 226.

The lower tube 226 has a closed lower end and an open upper end. The upper tube 224 is received into the lower tube 226 through its open upper end. A seal 250 is provided at the location where the upper tube 224 enters the open end of the lower tube 226 and is preferably supported by the lower tube 226 and in sealing engagement with the upper tube 224 to substantially prevent damping and/or lubrication fluid from exiting, or a foreign material from entering, the fork leg 220.

A hydraulic damping system 240 provides a damping force in both the compression and rebound directions to slow both compression and rebound motions of the suspension fork by controlling the fluid flow of the damping fluid contained within the damping system 240. In the first exemplary embodiment, the damping system 240 is preferably an open-bath, cartridge-type damper assembly having a damping cartridge tube 252 fixed with respect to the closed end of the lower tube 226, defining an main fluid chamber 263, and extending vertically upward. A damper shaft 254 extends vertically downward from a closed upper end of the upper tube 224, through cartridge tube cap 260, and supports a piston 258 at its lower end. Thus, the piston 258 is fixed for movement with the upper tube 224 while the cartridge tube 252 is fixed for movement with the lower tube 226.

Figure 2:
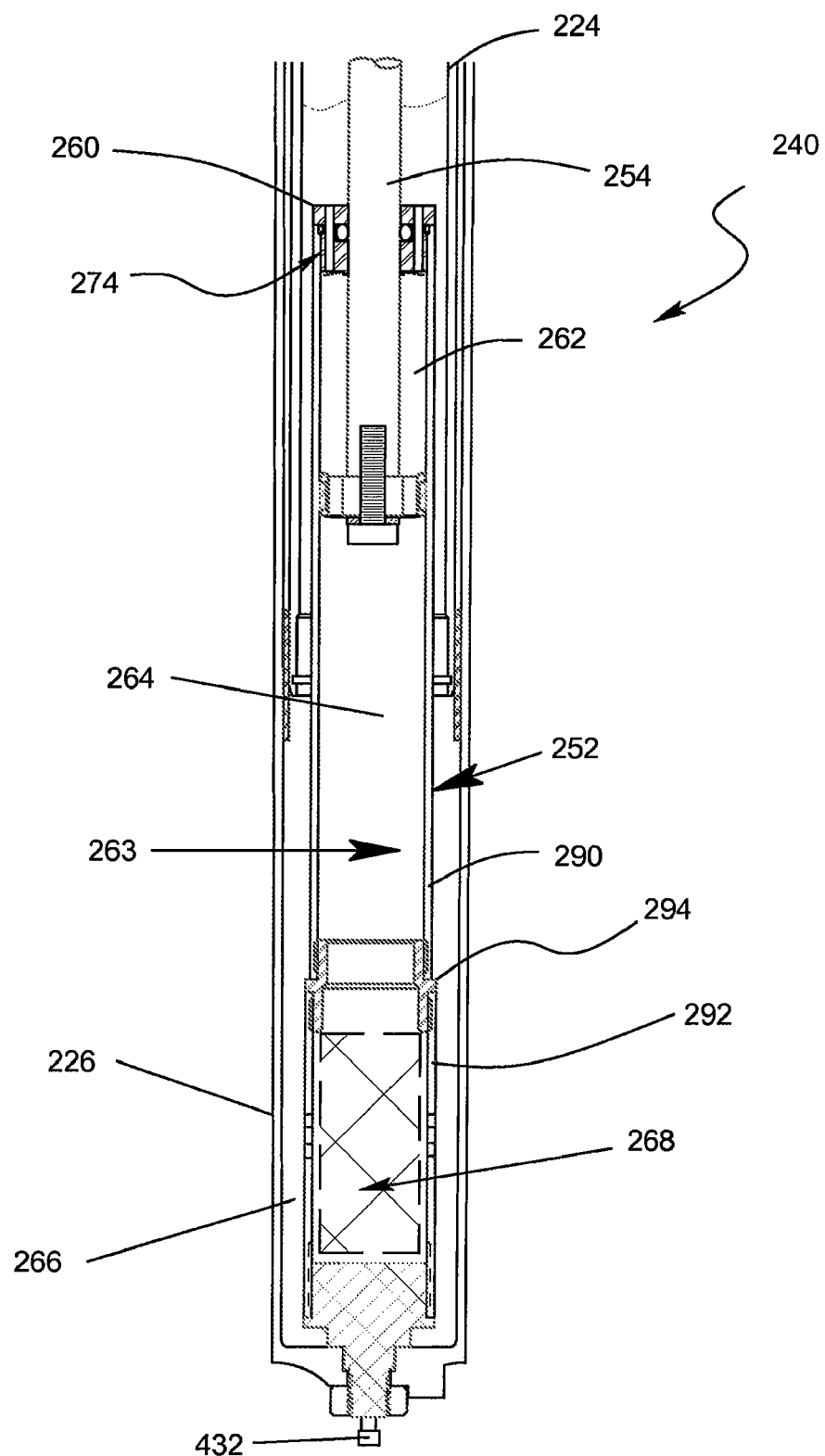
FIG. 2 depicts an enlarged cross-section of a lower portion of the fork leg depicted in FIG. 1.

The piston 258 divides the main fluid chamber 263 of the cartridge tube 252 into a first variable volume fluid chamber 262 and a second variable volume fluid chamber 264, which may sometimes be referred to as a compression chamber (best seen in FIG. 2). The first chamber 262 is positioned above the piston 258 and the second chamber 264 is positioned below the piston 258. A reservoir chamber 266 is defined between the outer surface of the cartridge tube 252 and the inner surfaces of the upper and lower tubes 224, 226. A base valve assembly 268 is positioned between the second chamber 264 and the reservoir chamber 266 and allows selective fluid communication therebetween. For clarity, the details of base valve assembly 268 are not depicted in FIGS. 1, 2; rather the details of base valve assembly 268 are shown in FIGS. 3A, 3B, 4A, 4B.

Cartridge tube cap 260 includes a one-way refill valve 274 (FIG. 2), which, during inward motion of the damper shaft 254 with respect to the cartridge tube 252, allows fluid flow from the reservoir chamber 266 into the first chamber 262. Thus, in an open-bath damper such as this, damping fluid flows into and out of the damping cartridge tube 252.

Cartridge tube 252 may comprise an upper cartridge portion 290 (FIG. 2) and a lower cartridge portion 292, which are threadably engaged with a cartridge connector 294 to form the cartridge tube 252. Optionally, a one-piece cartridge tube may be employed. A base valve housing connector 296 is fixed to the end of the lower tube 226 and supports the cartridge tube 252 on top of the base valve assembly 268 (which is located in the cartridge tube 252). The lower cartridge portion 292 of the cartridge tube 252 is preferably threadably engaged with the base valve housing connector 296.

First Suspension Fork Embodiment

General Base Valve Assembly Structure

Figure 3A:
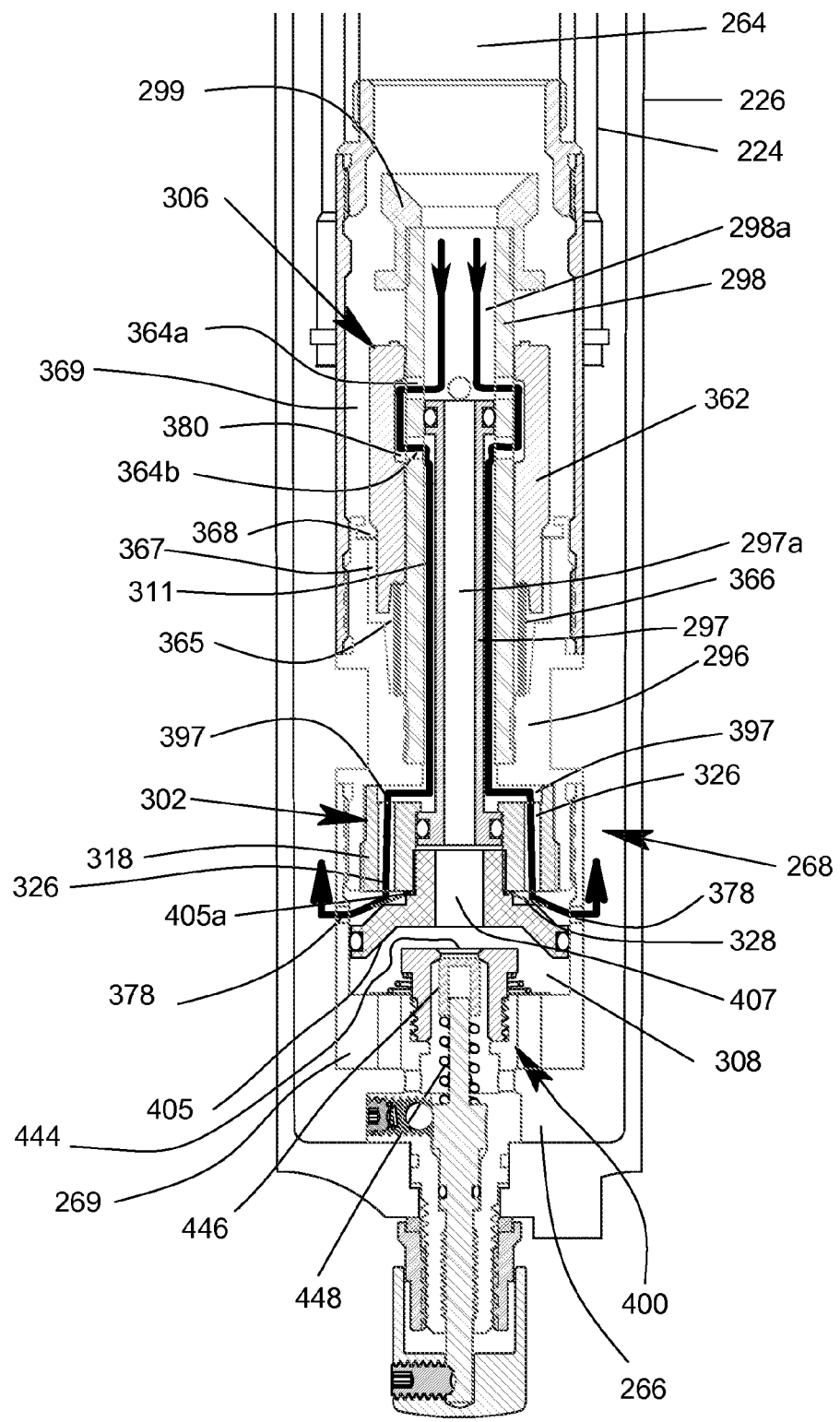
FIGS. 3A and 3B depict a base valve assembly of an exemplary embodiment of the invention in first and second configurations.
Figure 3B:
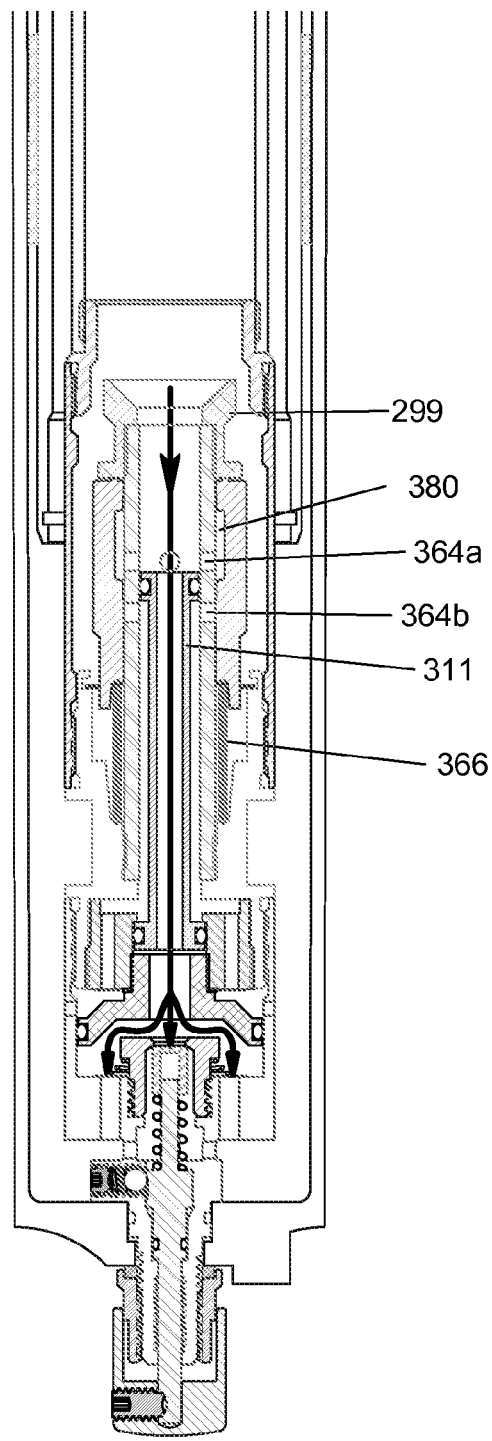

FIGS. 3A and 3B depict the details of a base valve assembly 268 according to an exemplary embodiment of the invention.

The base valve assembly 268 according to an exemplary embodiment of the invention may include a variety of different types of valves for regulating different aspects of fluid flow through damping mechanism 240, such as, but not limited to: a compression valve 302, a pressure-relief valve 400, and a lockout feature in the form of an inertia valve 306.

The compression valve 302 includes a compression piston 318 sealingly engaged with the lower portion of the base valve housing connector 296. The compression valve 302 is positioned in a pocket formed by base valve housing 269 and base valve housing connector 296. As will be described below, compression valve 302 controls the fluid flow of damping fluid that has past through an open inertia valve 306.

The compression piston 318 includes one or more compression passages 326 covered by a compression shim stack 328. The compression shim stack 328 is secured to the lower surface of the compression piston 318 by a shoulder 405a of the pressure-relief chamber partition 405. The compression shim stack 328 may deflect about the shoulder 405a to selectively open the compression passages 326 and place them in fluid communication with compression outlet passages 378 during the compression of the suspension fork.

The inertia valve 306 is preferably somewhat similar to the inertia valve previously described in our earlier '948 and '751 patents. Therefore, we will not provide a complete description of its structure and function at this time, since reference may be made to our other patents for more detail.

Generally, inertia valve 306 includes an inertia mass 362 movable between a closed position, where the inertia mass 362 isolates inertia inflow passage 364a from inertia outflow passage 364b (FIG. 3B), and an open position, where an annular recess 380 in the inertia mass 362 places inertia inflow passage 364a and inertia outflow passage 364b in fluid communication with each other and inertia valve flow path 311 (FIG. 3A). Inflow and outflow passages 364a, 364b may generally comprise a plurality of radially aligned ports formed in the wall of the main fluid flow tube 298. Inertia valve flow path 311 is formed by a space between main fluid flow tube 298 and pressure-relief tube 297. When the inertia valve 306 is open (FIG. 3A), fluid flow is allowed through annular recess 380, through inertia valve flow path 311, through the inertia valve fluid chamber 397, and then through the compression passages 326, past the shim stack 328 and into the reservoir chamber 266 through compression outlet passages 378 in the base valve housing 269. When the inertia valve 306 is closed (FIG. 3B), fluid is, at least partially, and preferably substantially, prevented from flowing into the inertia valve flow path 311.

The inertia mass 362 is biased into its closed position (FIG. 3B) by inertia valve spring 366 (shown schematically). The inertia mass 362 of the current invention is preferably a solid block of high-density material, such as brass, as described in, for example, our earlier '751 and '948 patents. While the inertia mass 362 of the current invention is solid as distinguished from the inertia masses of our earlier patents, which included kidney-shaped axial flow passages to provide an exit for damping fluids displaced from the inertia valve pocket by the inertia mass (see e.g. FIGS. 4A-C of our earlier '948 patent), the current invention may also use the design of our earlier patents.

In the current invention, fluid displaced from the inertia valve pocket 365 by the inertia mass 362 travels up a first displaced fluid gap 367, past a displaced fluid check valve 368, and up a second displaced fluid gap 369. The displaced fluid check valve 368, by allowing fluid to enter and exit the inertia valve pocket 365 only at a controlled rate, facilitates the return of the inertia mass 362 to its rest (closed) position in a predetermined and predictable time period.

Finally, the clearances of the displaced fluid check valves 368 can be important to the responsiveness and quick actuation of the inertia valve 306. We have determined that the clearances for check valves 368 should be between 0.001"-0.010" wide and the second displaced fluid gap 369 should be between 0.030"-0.200" wide.

First Suspension Fork Embodiment

Basic Pressure-Relief

The suspension fork according to the invention is provided with a pressure-relief feature. The pressure-relief feature may comprise a pressure-relief valve 400. The pressure-relief valve 400, which may sometimes be referred to as a blow-off valve, is positioned below the pressure-relief chamber partition 405, and shown in more detail in FIGS. 4A and 4B (although the full details and description of the blow-off valve's operation may be found in our earlier '136 patent). The compression valve 302 and the pressure-relief valve 400 are fluidically isolated from one another by the pressure-relief chamber partition 405. A pressure-relief chamber 308 is defined between base valve housing 269 and pressure-relief chamber partition 405.

Pressure-relief chamber 308 is in open and unrestricted fluid communication with compression chamber 264 (see FIG. 3A). Fluid communication is achieved by a fluid passageway 407 in the pressure-relief chamber partition 405 that accesses a fluid passageway 297a through pressure-relief tube 297, which itself is positioned within main fluid flow tube 298. Funnel 299 may be used for directing the fluid from compression chamber 264 into main fluid flow passageway 298a and fluid passageway 297a.

Figure 4A:
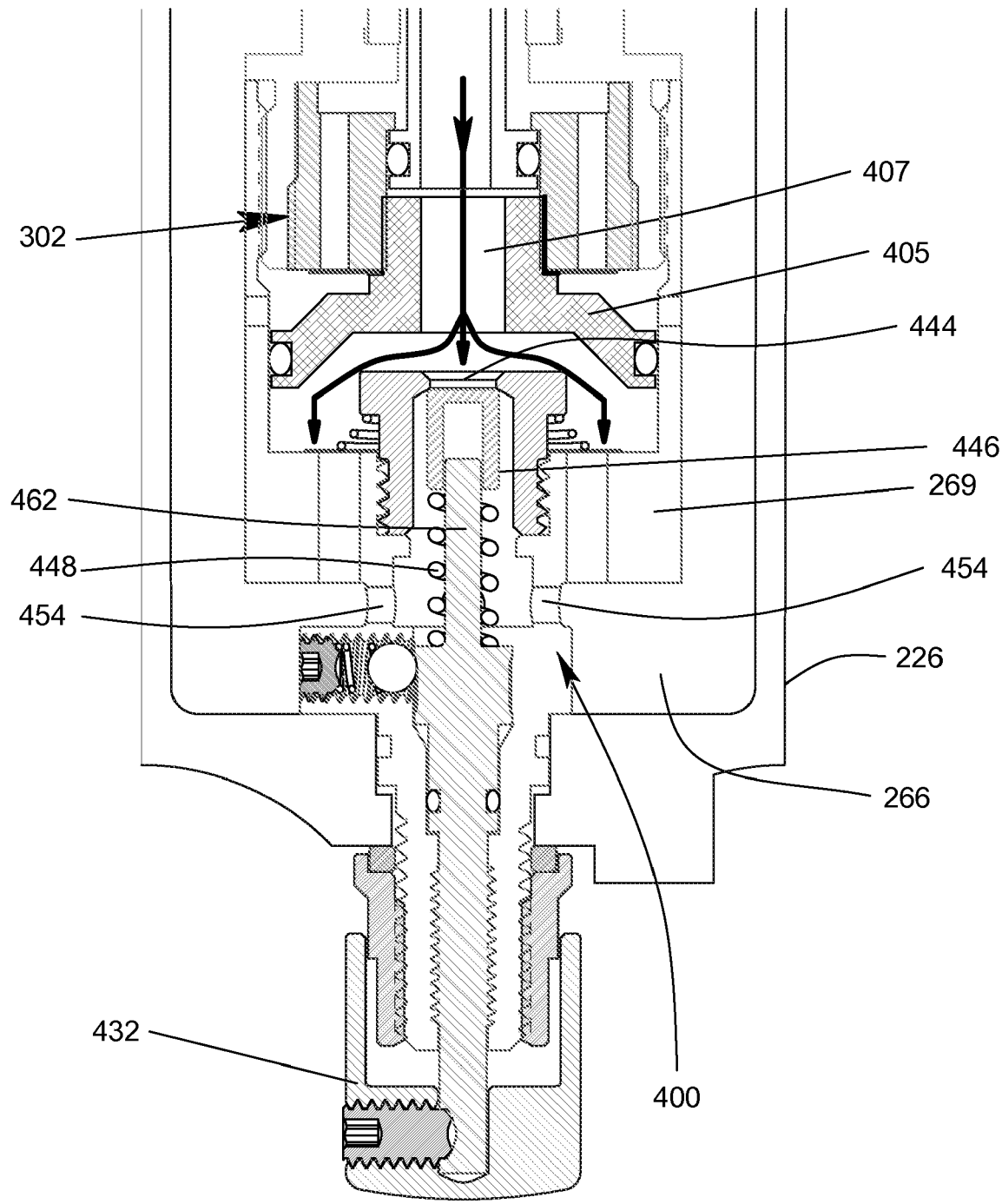
FIGS. 4A and 4B depict the adjustable pressure-relief valve of an exemplary embodiment of the invention in closed and open configurations, respectively.

When the fluid pressure of the damping fluid within the pressure-relief chamber 308 has not achieved a threshold value sufficient to overcome the pre-load of pressure-relief spring 448, pressure-relief piston 446 does not move relative to the pressure-relief inlet 444 and fluid flow from the pressure-relief chamber 308 to reservoir chamber 266 is substantially prevented (FIG. 4A).

Figure 4B:
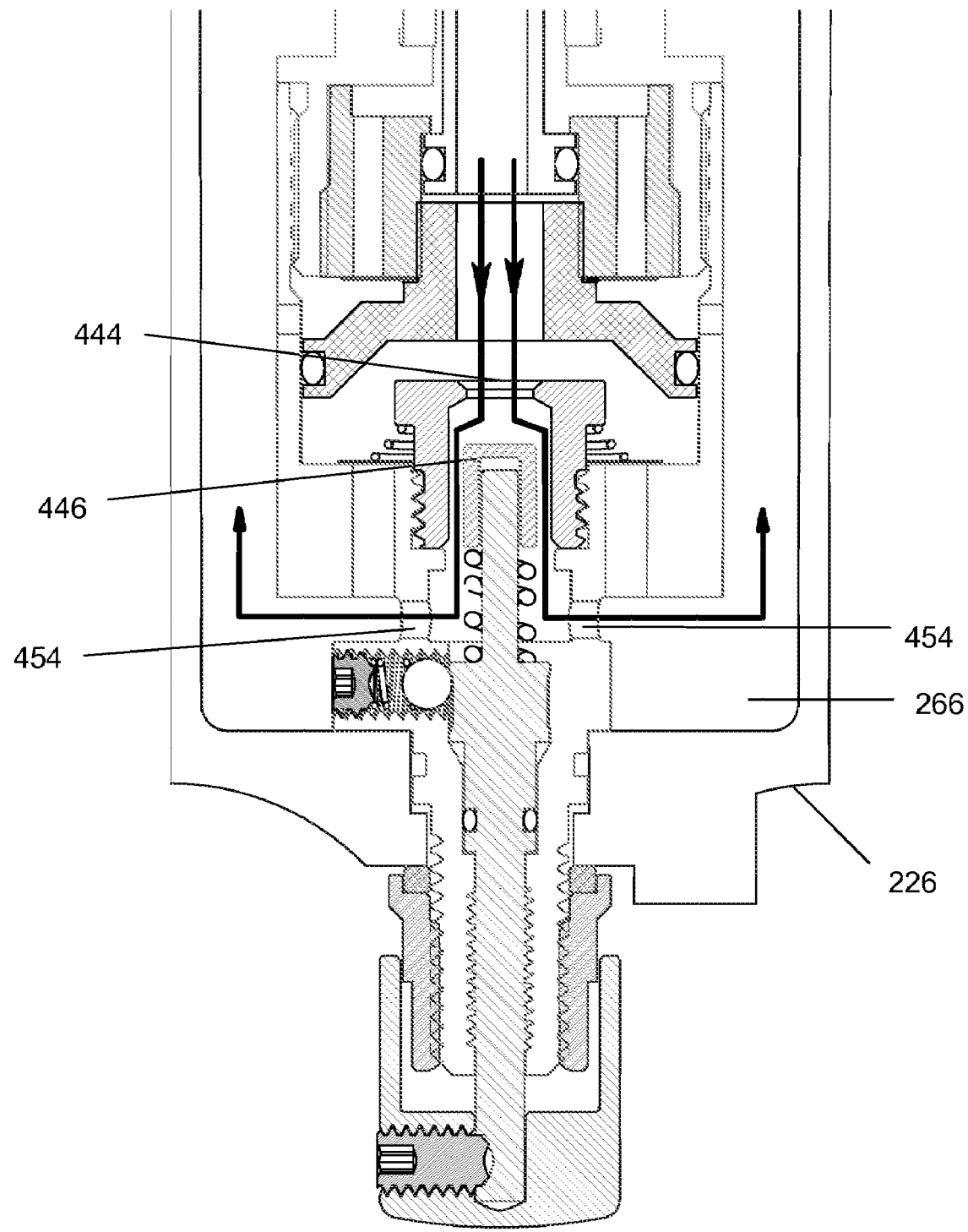

When the fluid pressure of the damping fluid within the pressure-relief chamber 308 achieves a threshold value sufficient to overcome the pre-load of pressure-relief spring 448, pressure-relief piston 446 will move relative to the pressure-relief inlet 444 and fluid flow from the pressure-relief chamber 308 to reservoir chamber 266 through pressure-relief outlets 454 is allowed (FIG. 4B).

First Suspension Fork Embodiment

Basic Operation

Having described the basic structure of a suspension fork 10 and a base valve assembly 268 according to an exemplary embodiment of the invention, their basic operation will now be described.

When the front wheel (not shown) of a bicycle (not shown) encounters a bump, as is generally known to those skilled in the art, a force is exerted on the suspension fork 10 that tends to compress the fork tubes 224, 226 in relation to each other by upwardly accelerating lower fork tube 226. If the upward acceleration of the lower fork tube 226 along its longitudinal axis (which is the same as the axis of travel of the inertia mass 362) is below a predetermined threshold defined by the pre-load on inertia valve spring 366, the inertia mass 362 will not move and remains in its closed position, preventing fluid flow through the annular recess 380 and into inertia valve flow path 311 (FIG. 3B). Increased pressure within the compression chamber 264 due to the force exerted on the suspension fork 10 is communicated through the main fluid flow passageway 298a, fluid passages 297a and 407 and into the pressure-relief chamber 308.

If the fluid pressure within the pressure-relief chamber 308 has not achieved the threshold value needed to overcome the pre-load of pressure-relief spring 448, the pressure-relief valve 400 remains closed, substantially preventing fluid flow. Therefore, the suspension fork 10 remains substantially rigid because most fluid flow has been prevented (i.e., only movement resulting from a fluid bleed, clearance leakage, or fluid compressibility may occur). This is shown in FIG. 4A, where the compression flow does not continue past the pressure relief chamber 308. Under these conditions, the damping cartridge 252 and suspension fork 10 are referred to as being "locked out".

The pressure-relief valve 400 selectively allows fluid flow from the compression chamber 264 to the reservoir 266 at high compressive fluid pressures or shaft speeds. Preferably, the pressure-relief valve 400 remains closed at low and mid-compressive fluid pressures or shaft speeds. Advantageously, "lock out" of the suspension fork 10 prevents rider pedal energy from being absorbed by the suspension fork 10 thereby allowing such energy to instead promote forward motion of the bicycle. If a large bump is encountered, such that the pressure within the compression chamber 264 rises above the threshold necessary to open the pressure-relief valve 400, the valve 400 operates to allow fluid flow from the compression chamber 264 to the reservoir 266. Advantageously, this prevents damage to the various seals of the suspension fork 10 and prevents the entire force of the bump from being transferred to the rider.

If the fluid pressure within the pressure-relief chamber 308 due to the fluid flow of damping fluid into pressure-relief chamber 308 achieves the threshold pressure needed to overcome the pre-load of pressure-relief spring 448, the pressure-relief valve 400 will open to allow fluid to flow into the reservoir chamber 266 through the pressure-relief outlets 454. Thus, the suspension fork 10 is able to compress and its compression damping rate is determined primarily by the spring rate of pressure-relief spring 448 of the pressure-relief valve 400 and the diameter of pressure-relief inlet 444. This is referred to as "blowoff". This use of the term "blowoff" should not be confused with the less common usage, such as in U.S. Pat. No. 6,120,049 ("blowoff" is used in the context of rebound refill check valves).

When the upward acceleration of the lower fork leg 226 exceeds a predetermined threshold, the inertia mass 362 overcomes the biasing force of the inertia valve spring 366 and moves into a position that places the passages 364a and 364b into fluid communication with each other via annular recess 380 and fluid flow is allowed into the inertia valve flow path 311 formed by a space between main fluid flow tube 298 and pressure-relief tube 297. This flow proceeds through the inertia valve fluid chamber 397 and then through the compression passages 326, past the shim stack 328 and into the reservoir chamber 266 through compression outlet passages 378 in the base valve housing 269, as illustrated in FIG. 3A. Accordingly, at pressures lower than the predetermined pressure-relief pressure, when the inertia mass 362 is open (down), fluid is permitted to flow from the compression chamber 264 to the reservoir chamber 266 and the suspension fork 10 is able to compress. The compression damping rate is determined primarily by the spring rate of the compression shim stack 328. Under these conditions, the damping cartridge 252 and suspension fork 10 are referred to as being not "locked out".

First Suspension Fork Embodiment

Adjustable Pressure-Relief

In some prior inertia valve suspension forks, such as those described in our earlier '751 and '948 patents, pressure-relief was achieved using a pressure-relief shim stack for controlling the fluid flow between what is called a blowoff chamber, the separator chamber, and the reservoir (see FIG. 17 and associated text in our earlier '751 and '948 patents). In these prior designs, there is no capability to externally (and especially "on-the-fly") adjust the threshold pressure because the pressure-relief feature was contained entirely inside the suspension damper. Therefore, the threshold pressure could only be changed by taking the suspension fork and cartridge apart and replacing the pressure-relief shim stack with another shim stack having a different thickness/spring rate. This process was not conducive to the operator/rider selecting and/or adjusting the threshold pressure on any regular basis and especially "on-the-fly" (e.g. during the course of a ride) and without the use of tools.

However, as described in our earlier '136 patent, it is often preferable for the operator/rider to have the ability to select and/or adjust the threshold pressure on a regular basis. Therefore, an ability to adjust the threshold pressure "on-the-fly", in the sense of "on the trail" and without the use of tools was proposed.

Accordingly, the suspension fork 10 according to the current invention has been provided with a pressure-relief feature in the form of an adjustable pressure-relief valve 400 having portions positioned inside and outside the suspension fork. As previously mentioned, adjustable pressure-relief valve 400 may be very similar to the valve described as a blowoff valve in our earlier '136 patent and therefore we will not provide a complete description of its structure and function at this time, since reference may be made to our earlier '136 patent.

However, generally, a rotatable pressure-relief adjustment knob 432, positioned outside of the suspension fork provides the capability of easily adjusting the threshold pressure.

In particular, knob 432 is attached to support shaft 462. Therefore, rotation of knob 432 causes the rotation of the support shaft 462. Furthermore, through threads in lower tube and support shaft 462, rotation of support shaft 462 is converted to axial movement of the support shaft 462 relative to the base valve assembly 268. This axial movement of the support shaft 462 changes the compressed or pre-loaded length of the portions of the pressure-relief feature positioned within the suspension fork, such as pressure-relief spring 448, and thereby varies the pre-load on the pressure-relief spring 448. The pre-load of the pressure-relief spring 448 influences the threshold pressure within the pressure-relief chamber 308 that is necessary to open the pressure-relief valve 400. More pre-load raises the threshold pressure, while less pre-load decreases the threshold pressure.

Thus, pressure-relief threshold pressure adjustment knob 432, positioned external to the cartridge tube 252, the suspension fork leg 220, and tubes 224, 226, allows for the operator/rider to have the ability to select and/or adjust the threshold pressure on a regular basis and especially "on-the-fly", in the sense of "on the trail" and without the use of tools was proposed.

Second Suspension Fork Embodiment

Closed Damper

Figure 5:
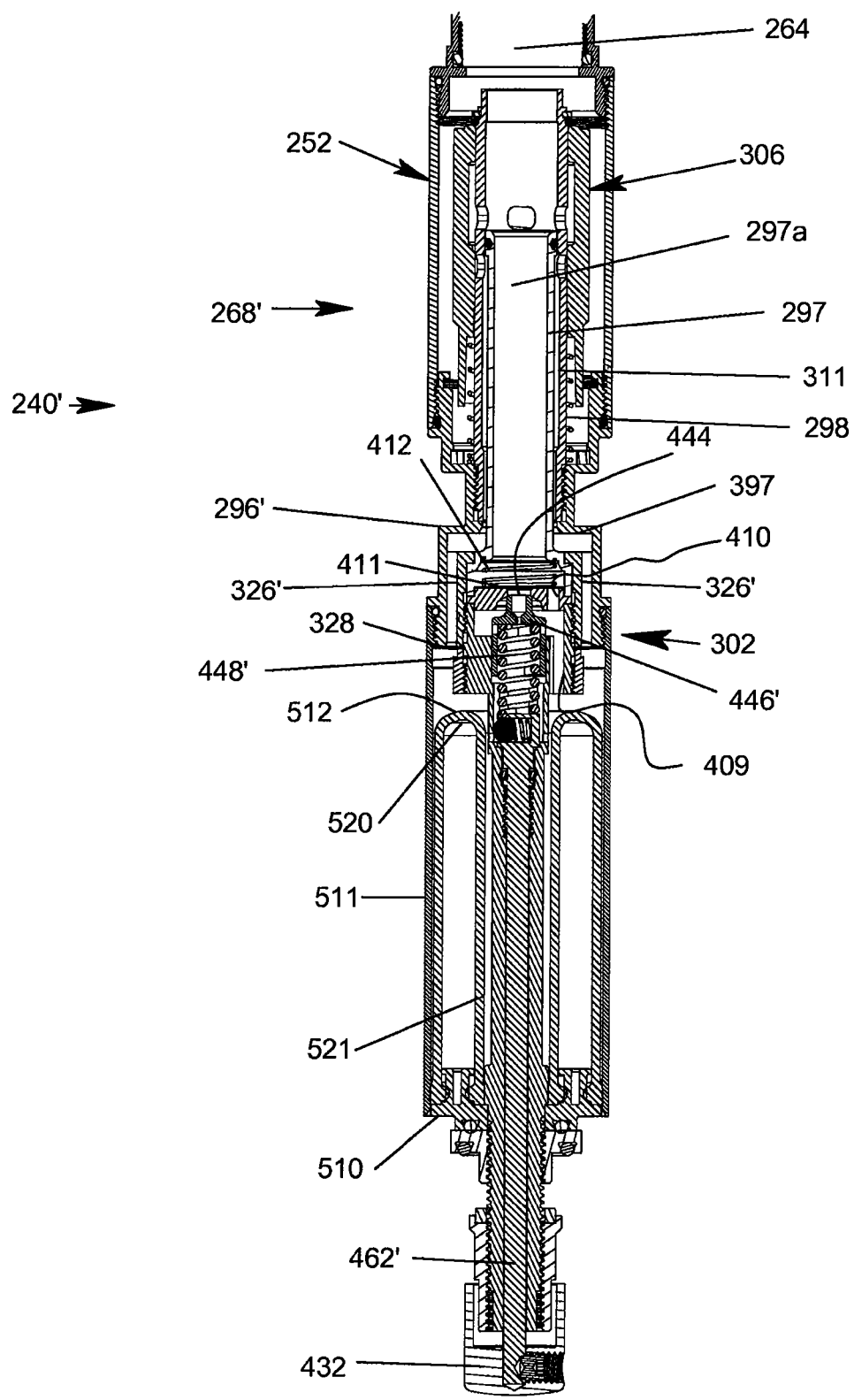
FIG. 5 depicts an enlarged cross-section of a lower portion of a suspension fork according to a second exemplary embodiment of the invention.

FIG. 5 depicts an enlarged cross-section of a lower portion of a suspension damper according to a second exemplary embodiment of the invention. This exemplary embodiment is similar to the first exemplary embodiment in that it comprises a suspension fork with a damping mechanism 240' that includes a base valve assembly 268' having an: inertia valve 306; a compression valve 302 and an adjustable pressure-relief valve 400. What differentiates the second exemplary embodiment from the first exemplary embodiment are: the complete sealing of cartridge tube 252, the inclusion of a fluid biasing element (for example, in the form of a bladder), and the elimination of reservoir chamber 266. These differences convert the open-bath damper of the first exemplary embodiment into the closed damper of the second exemplary embodiment. Benefits of closed dampers over open-bath dampers are: decreased amount of damping fluid needed to operate the damping mechanism and less chance for the damping fluid to become aerated. Aeration tends to degrade the performance of damping fluid (i.e., degrades its incompressibility) and results in an effect sometimes referred to as "lockout lag".

As shown in FIG. 5, the differences between the first exemplary embodiment and the second exemplary embodiment generally begin in the area of base valve housing connector 296'. In this second exemplary embodiment, base valve housing connector 296' has been made unitary with the compression piston. Therefore, base valve housing connector 296' has compression passages 326' (in fluidic communication with the inertia valve flow path 311) selectively blocked by compression shim stack 328. Similarly, base valve housing connector 296' has first and second rebound passages 409, 410 and rebound check plate 411, loaded by rebound spring 412, for controlling rebound flow through second rebound passage 410.

Base valve housing 269 of the first exemplary embodiment is now replaced with cartridge bottom 510 that is connected to base valve housing connector 296' via extension cylinder 511. A portion of the inner volume bound by the extension cylinder 511 defines an internal fluid reservoir 512. Additionally, within extension cylinder 511 is a fluid biasing element, preferably in the form of a bladder 520, a well-known component in damping technology, and that may be made of any known flexible, fluid resistant, and resilient material. The bladder 520 preferably has an annular shape defining an open center portion 521. Support shaft 462' can extend through the open center portion 521 from the general area of the pressure-relief piston 446' and pressure-relief spring 448' to, and external of, cartridge bottom 510. This annular bladder 520 is described in more detail in our co-pending application entitled "Damping Cylinder with Annular Bladder", U.S. Ser. No. 11/291,058, filed on Nov. 29, 2005, and incorporated by reference herein.

As is known in the art, bladder 520 acts in a manner similar to other fluid biasing elements, such as gas or coil springbacked internal floating pistons ("IFPs") to keep the damping fluid in the internal fluid reservoir 512 under pressure as the damping fluid exits and enters internal fluid reservoir 512 and keep the gas within bladder 512 and the damping fluid separate.

Having described the basic structure of a suspension fork 10 according to this second exemplary embodiment of the invention and in the form of a closed damper that does not allow fluid to flow into and out of the damping cartridge 252, its basic operation will now be described.

a) Inertia Valve Closed Fluid—flows down fluid passage 297a, through pressure-relief inlet 444 and into contact with pressure-relief piston 446'. If the fluid threshold pressure is reached, the fluid pressure on pressure-relief piston 446' will overcome the pre-load of pressure-relief spring 448' and cause pressure-relief piston 446' to descend and open, and fluid flow into reservoir 512 through passage 409 is allowed. If the threshold pressure is not reached, the fluid pressure on pressure-relief piston 446 will not overcome the pre-load of pressure-relief spring 448', pressure-relief piston 446' will remain closed, and fluid flow into internal fluid reservoir 512 through passage 409 will be substantially prevented. Therefore, tubes 224, 226 will not be capable of substantial relative movement and the suspension fork 10 will remain substantially rigid.

b) Inertia Valve Open—Fluid flows down inertia valve flow path 311, through inertia valve fluid chamber 397, and into compression passages 326'. The fluid pressure on the fluid will overcome the spring force of compression shim stack 328 and fluid will flow into internal fluid reservoir 512 providing the fork the ability to compress.

c) Rebound—As tubes 224, 226 extend apart and the fluid pressure decreases in compression chamber 264, fluid will flow from the internal fluid reservoir 512 back to the compression chamber 264. This rebound flow will travel up passages 409 and 410 and overcome the bias on rebound spring 412, deflect rebound plate 411 and allow the fluid flow to continue up passage 297' and back into the compression chamber 264.

Thus, with the second exemplary suspension fork embodiment, there is no circulation of fluid outside of cartridge tube 252 during the operation of the damping mechanism 240'. This reduces the opportunity for the fluid to become aerated and have its performance degraded. In other words, while the first exemplary embodiment has a cartridge tube 252 that was substantially sealed (i.e., fluid normally contained within the cartridge but can enter and leave the cartridge during rebound and compression, respectively), the second exemplary embodiment has a cartridge tube 252 that is completely sealed (i.e., fluid cannot enter and leave the cartridge absent deconstruction or rupturing of cartridge tube 252).

Fluid Bleed

In General

A fluid bleed feature can be incorporated into any of the suspension dampers according to the various exemplary embodiments of the invention. An example of a fluid bleed is shown in FIG. 6, which is a modification of the exemplary embodiment of FIG. 5.

Figure 6:
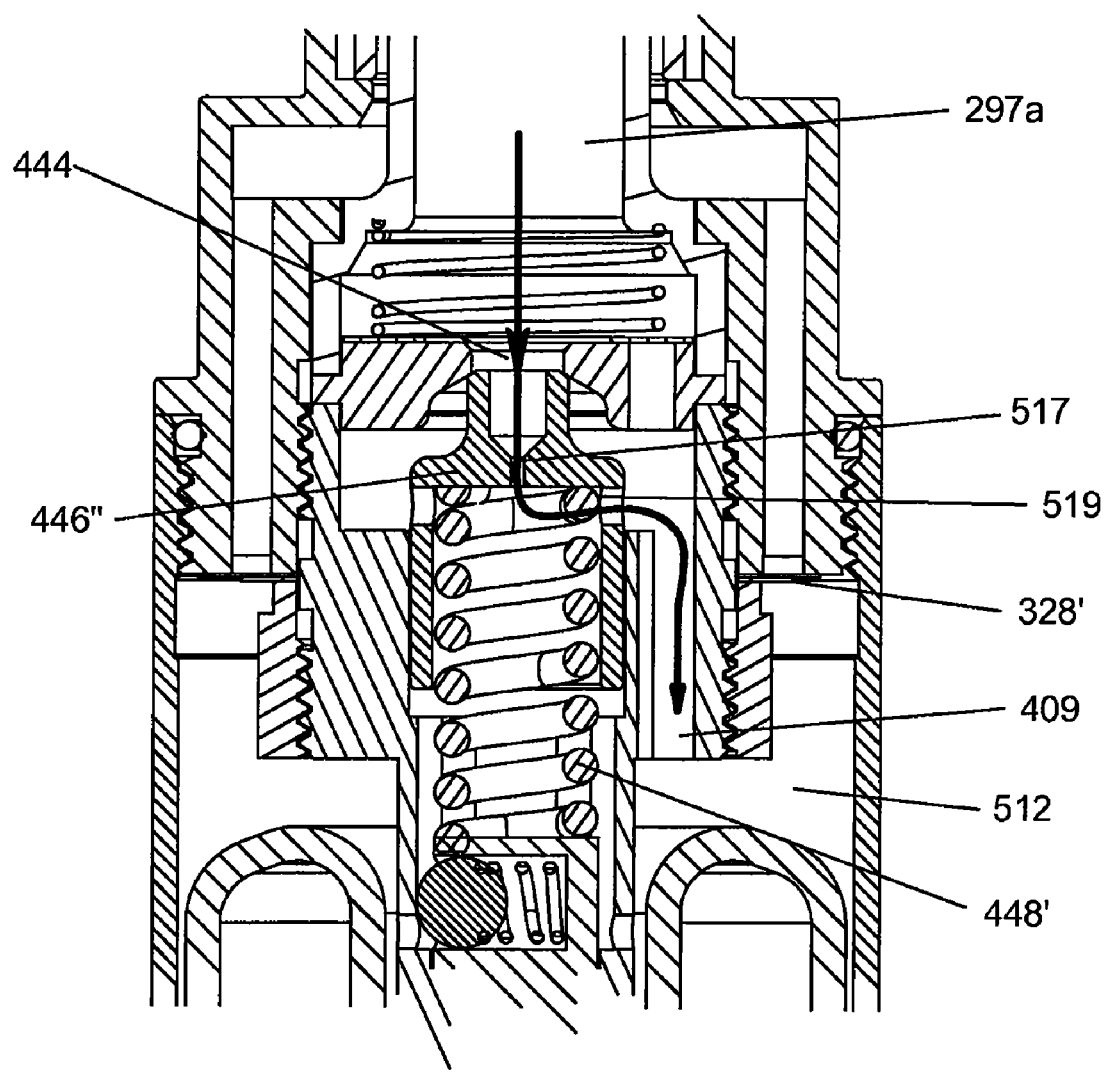
FIG. 6 depicts a non-adjustable fluid bleed feature that may be used with a base valve according to the various embodiments of the invention.

In FIG. 6, pressure-relief piston 446" is not solid as depicted in other figures herein, but includes a bleed inlet passage 517 and a bleed outlet passage 519, having an exemplary diameter of 0"-0.012" that provides at least one alternative fluid path between fluid passage 297a and internal fluid reservoir 512 to allow for a bleed flow Q. These bleed passages 517, 519 provide for only low speed fluid flows because at higher speeds, the resulting fluid pressures open the pressure-relief feature. An exemplary purpose for having this low-speed fluid bleed path is to provide a means by which when a rider mounts their bicycle (not shown) and places the initial load (i.e., their body weight) on the suspension fork, the suspension fork can slowly compress to its loaded position ("sag"). Note that in a suspension fork having a bleed, even when the suspension fork is in a position that sometimes may be referred to as locked out (either manually or by use of an inertia valve), during very low speed compression the suspension fork retains at least some degree of compressibility (regardless of whether the fluid pressure-relief valve has opened). Therefore, under such conditions the fork is not, nor would it be considered, "completely rigid".

Fluid Bleed

Adjustable

The fluid bleed feature may also be manually adjustable.

Figure 7:
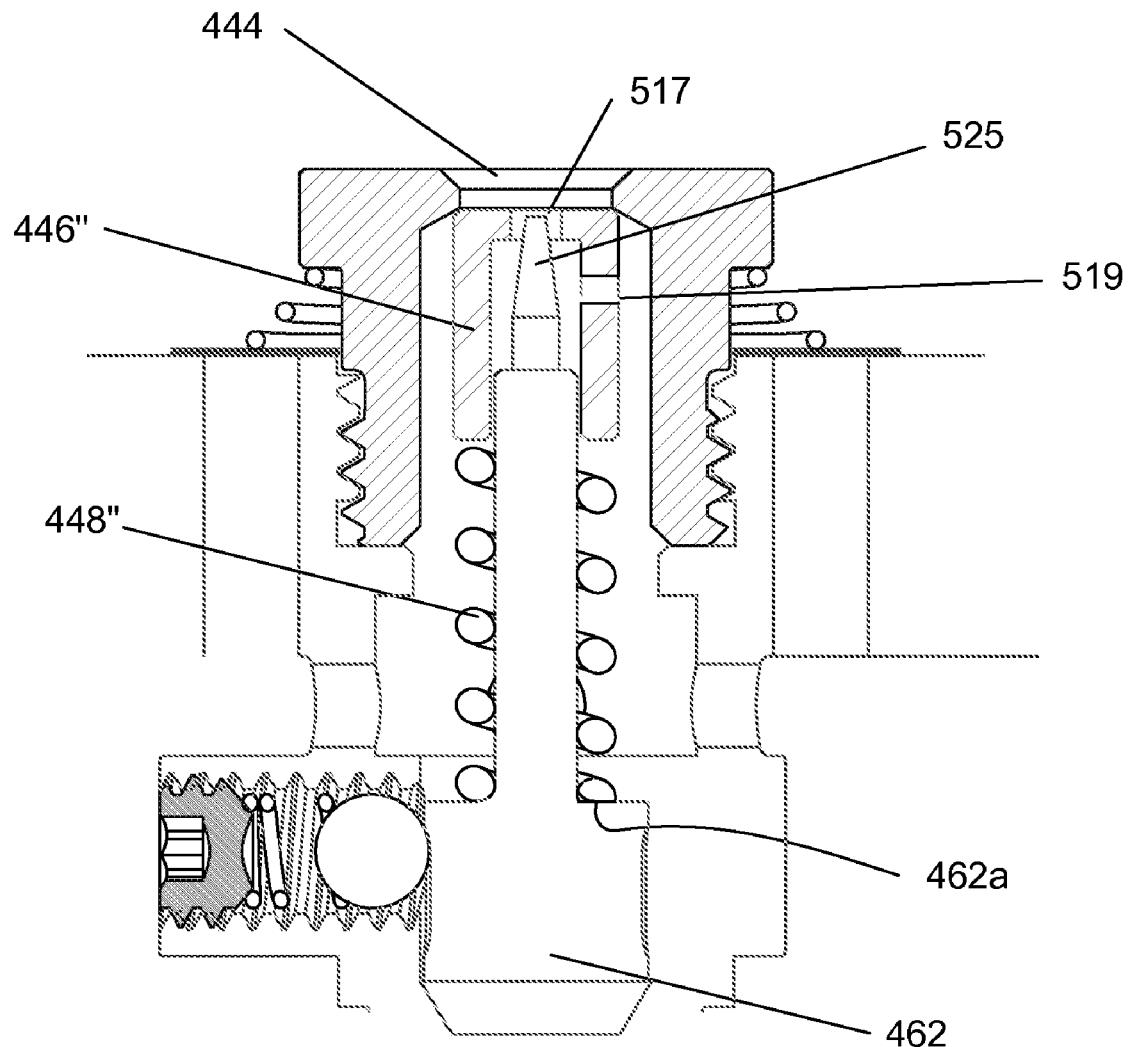
FIG. 7 depicts an adjustable fluid bleed feature that may be used with a base valve according to the various embodiments of the invention.

An exemplary embodiment of a manually adjustable fluid bleed feature is shown in FIG. 7. Pressure-relief spring 448" is maintained between pressure-relief piston 446" and the upper surface 462a of shaft 462. Support shaft 462 is now provided with a tapered bleed needle 525 at its upper end. Thus, as shaft 462 axially moves as it is rotated by turning knob 432, bleed needle 525 will move towards or away from bleed inlet 517 in pressure-relief piston 446" (which is biased against pressure-relief inlet 444) to vary the size of the bleed path while also varying the pre-load on pressure-relief spring 448".

Adjustable bleed allows a rider to control the rate at which the fluid may pass through the fixed-radius bleed inlet 517 and hence the ability of the suspension fork to sag or compensate for very low speed compression flows.

Rear Shock Absorber

Figure 8:
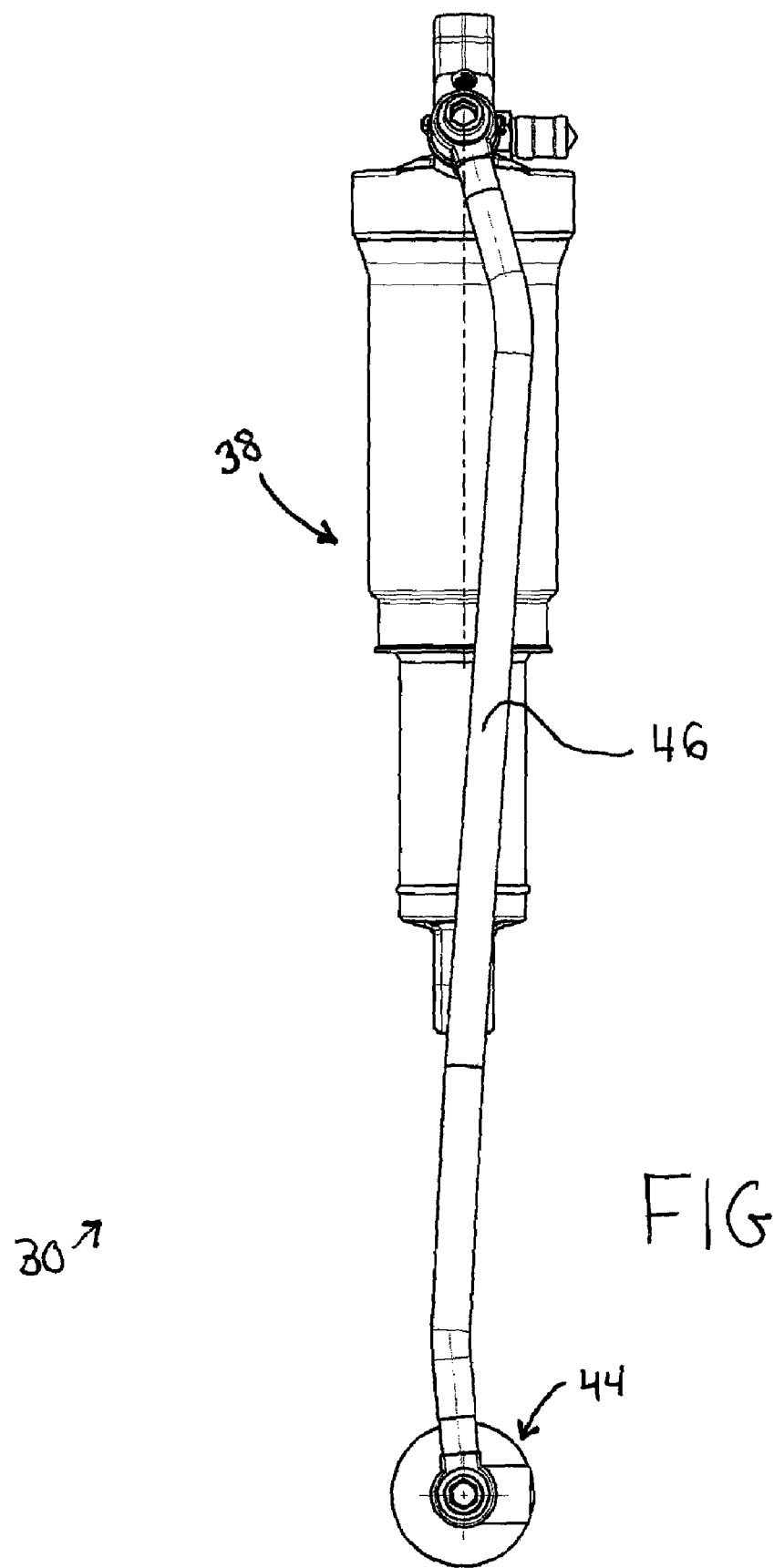
FIG. 8 depicts an assembly view of a suspension damper, in the form of a rear shock absorber having a remote reservoir, according to another exemplary embodiment of the invention.
Figure 9A:
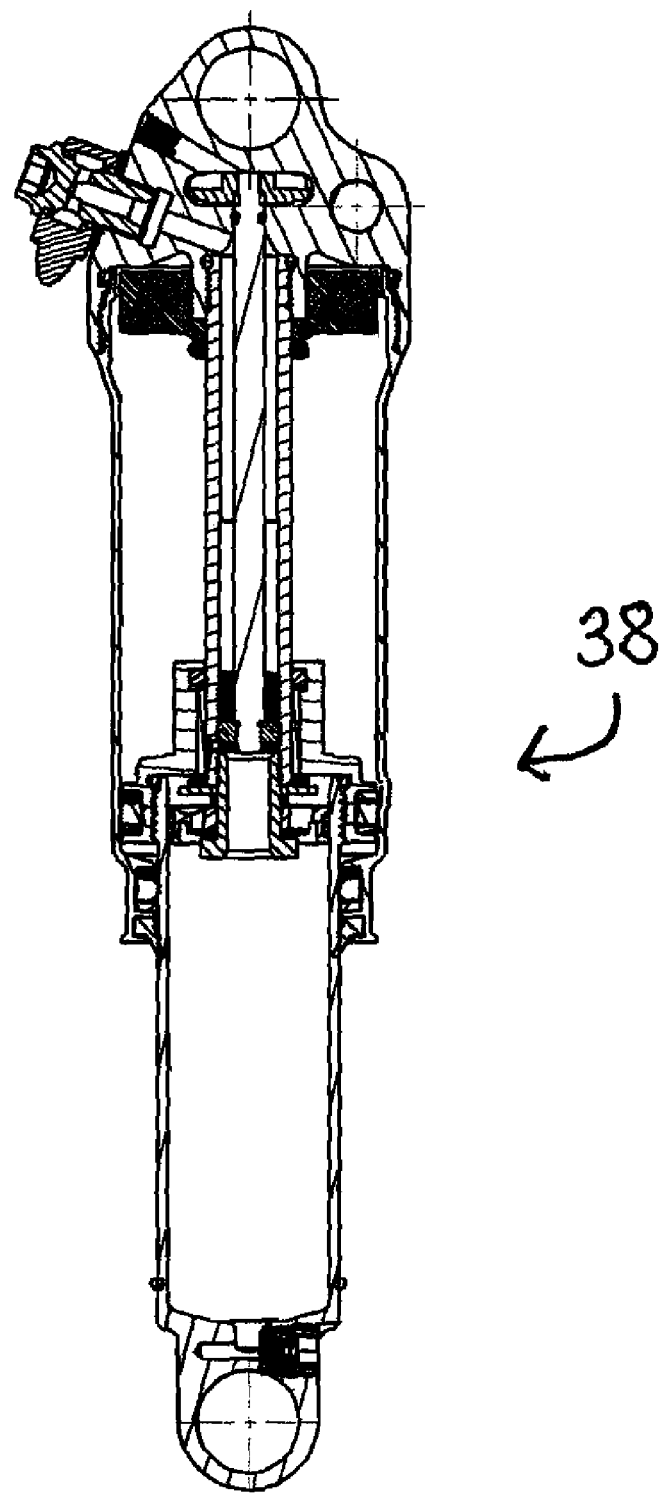
FIGS. 9A and 9B depict cross-section views of the rear shock absorber and remote reservoir of FIG. 8, respectively.
Figure 9B:
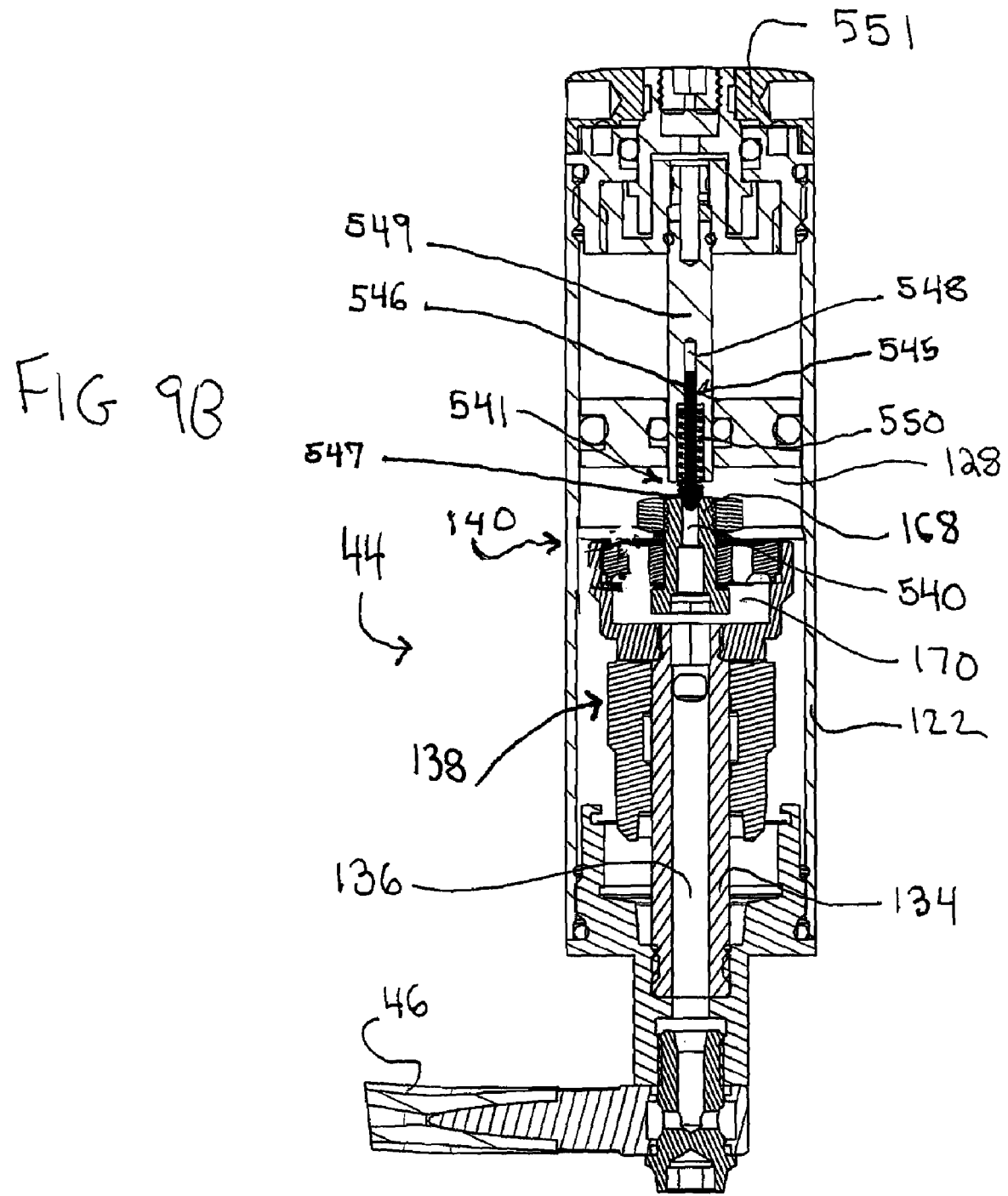

FIG. 8 depicts an assembly view of a suspension damper 30 according to another exemplary embodiment of the invention, in the form of a compressible rear shock absorber 38 having a remote reservoir 44. FIG. 9A depicts a cross-section view of the rear shock absorber 38. FIG. 9B depicts a cross-section view of remote reservoir 44, which contains an inertia valve 138. While rear shock absorber 38 is shown herein as fluidically connected to remote reservoir 44 by hose 46, it is also possible for reservoir 44 to be a piggyback reservoir, as known in the art. The operation of suspension dampers such as these is described in great detail in our earlier '751 and '948 patents.

The current exemplary embodiment of the invention provides these types of suspension dampers with an externally adjustable pressure-relief feature.

According to this exemplary embodiment of the current invention, as shown in FIG. 9B, reservoir 44 comprises a reservoir tube 122 containing an inertia valve 138. Within reservoir tube 122, a portion of the adjustable pressure-relief feature is provided in the exemplary form of a pressure-relief port 540 and a pressure-relief valve 541. Pressure-relief port 540 may be located in fastener 168. When open, pressure-relief port 540 provides an additional fluid flow circuit between blowoff chamber 170 and reservoir chamber 128 (i.e., in addition to blowoff valve 140). Pressure-relief valve 541, comprises a pressure-relief valve element 545, having a shaft portion 546 and a head portion 547, is mounted for longitudinal movement in a pressure-relief bore 548 in control shaft 549, and biased by spring 550 towards a position that blocks pressure-relief port 540. Control shaft 549 is attached to an adjuster, positioned outside of the suspension damper, for example, a rotatable adjustment knob 551, in any conventional manner that, depending upon the direction in which knob 551 is turned, control shaft 549 moves either towards or away from the blowoff valve 140. Accordingly, depending upon the direction in which knob 551 is turned, the pre-load on spring 550 increases or decreases. As with other embodiments of the invention described herein, the pre-load of spring 550 influences the threshold fluid pressure within the blowoff chamber 170 that is necessary to open the pressure-relief valve 541. More pre-load raises the threshold pressure, while less pre-load decreases the threshold pressure. The pre-load created by spring 550 will never exceed the spring force/pressure needed to open blowoff valve 140. Therefore, by the user rotating knob 551, the user can manually adjust the threshold pressure.

The blowoff valve 140 is primarily comprised of a cylindrical base and a blowoff cap. The upper end of the base is open and includes a threaded counterbore. The blowoff cap is includes a threaded outer surface engaging the threaded counterbore. A threaded fastener 168 fixes a valve seat of the pressure relief valve 541 to the blowoff cap. A lower end of the base is threaded and engages a threaded upper end of the reservoir shaft 134. A floating piston is disposed in the reservoir chamber 128 and isolates gas from the damping fluid. The control shaft 549 extends through the floating piston.

Having described the basic structure of a suspension damper 30 according to this exemplary embodiment of the invention and in the form of a rear shock absorber 38 having a remote reservoir 44, its basic operation will now be described.

When suspension damper 30 is subjected to a bump-induced compression that is not of a magnitude or direction that causes inertia valve 138 to open, fluid pressure in central passage 136 of reservoir shaft 134 is communicated to blowoff chamber 170. When the fluid pressure in blowoff chamber 170 is greater than or equal to the threshold pressure required to overcome the pre-load of spring 550, pressure-relief valve 541 will open and fluid will flow from blowoff chamber 170 to reservoir chamber 128 through pressure-relief port 540. This fluid flow allows the shock absorber to compress.

When shock absorber 38 is subjected to a large bump-induced compression that is still not of a magnitude or direction that causes inertia valve 138 to open, the fluid flow through central passage 136 of reservoir shaft 134 greatly increases the fluid pressure within blowoff chamber 170. Despite the fact that pressure-relief valve 541 will open and allow some fluid flow through pressure-relief port 540, if the fluid pressure within blowoff chamber 170 achieves a high enough value, the threshold pressure of blowoff valve 140 will be overcome and fluid will flow from the blowoff chamber 170 to the reservoir chamber 128 via the blowoff valve 140.

Thus, using knob 551, positioned outside of the shock absorber 38 and the reservoir 44, the operator/rider will have the ability to select and/or adjust the threshold pressure on a regular basis and especially "on-the-fly" (e.g. during the course of a ride) and without the use of tools.

CONCLUSION

Though the invention has been described with respect to certain exemplary embodiments, the scope of the invention is solely limited by the scope of the appended claims.

| Reference Numerals Used In This Application | |
|---|---|
| 10 | suspension fork (suspension damper) |
| 30 | suspension damper (shock absorber/reservoir) |
| 38 | rear shock absorber |
| 44 | remote reservoir |
| 46 | hose |
| 122 | reservoir tube |
| 128 | reservoir chamber |
| 134 | reservoir shaft |
| 136 | central passage |
| 138 | inertia valve assembly (remote reservoir) |
| 140 | blowoff valve |
| 168 | fastener |
| 170 | blowoff chamber |
| 220 | fork leg |
| 224 | upper tube |
| 226 | lower tube |
| 232 | crown |
| 240 | damping system |
| 250 | seal |
| 252 | damping cartridge tube |
| 254 | damper shaft |
| 258 | piston |
| 260 | tube cap |
| 262 | first variable volume fluid chamber |
| 263 | main fluid chamber |
| 264 | second variable volume fluid chamber/compression chamber |
| 266 | reservoir chamber |
| 268 | base valve assembly |
| 269 | base valve housing |
| 274 | refill valve |
| 290 | upper cartridge portion |
| 292 | lower cartridge portion |
| 294 | cartridge connector |
| 296 | base valve housing connector |
| 297 | pressure-relief flow tube |
| 297a | fluid passageway |
| 298 | main fluid flow tube |
| 298a | main fluid flow passage |
| 299 | funnel |
| 302 | compression valve |
| 306 | inertia valve |
| 308 | pressure-relief chamber |
| 311 | inertia valve flow path |
| 318 | compression piston |
| 326 | compression passages |
| 328 | compression shim stack |
| 362 | inertia mass |
| 364a | inertia inflow passage |
| 364b | inertia outflow passage |
| 365 | inertia valve pocket |
| 366 | spring |
| 367 | first displaced fluid gap |
| 368 | displaced fluid check valve |
| 369 | second displaced fluid gap |
| 378 | compression outlet passages |
| 380 | annular recess |
| 397 | inertia valve fluid chamber |
| 400 | pressure-relief valve |
| 405 | pressure-relief chamber partition |
| 405a | pressure-relief chamber partition shoulder |
| 407 | fluid passageway |
| 409 | first rebound passage |
| 410 | second rebound passage |
| 411 | rebound check plate |
| 412 | rebound spring |
| 432 | knob |
| 444 | pressure-relief inlet |
| 446 | pressure-relief piston |
| 448 | pressure-relief spring |
| 454 | pressure-relief outlet |
| 462 | support shaft |
| 462 | shaft portion |
| 462a | stationary surface |
| 510 | cartridge bottom |
| 511 | extension cylinder |
| 512 | internal fluid reservoir |
| 517 | bleed inlet |

-continued

Reference Numerals Used In This Application

| | |
|---|---|
| 519 | bleed outlet |
| 520 | bladder |
| 521 | open center portion (of bladder) |
| 525 | bleed needle |
| 540 | pressure relief port |
| 541 | pressure-relief valve |
| 545 | pressure-relief valve element |
| 546 | pressure-relief valve shaft portion |
| 547 | pressure-relief valve head portion |
| 548 | pressure-relief bore |
| 549 | control shaft |
| 550 | spring |
| 551 | knob |

The invention claimed is:

1. A suspension damper operable between a compressed position and an extended position, comprising:
a compression chamber having a volume reducing in response to operation of the suspension unit from the extended position to the compressed position;
a reservoir chamber;
damping fluid for flowing between the chambers;
an inertia valve at least substantially closing a first fluid path between the compression and reservoir chambers when in a closed position and movable to an open position in response to an acceleration of at least a portion of the damper, such acceleration equaling or exceeding a first threshold;
a pressure relief valve at least substantially closing a second fluid path between the compression and reservoir chambers when in a closed position and movable to an open position in response to pressure in the compression chamber equaling or exceeding an externally adjustable second threshold,
wherein at least one setting of the second threshold is operable so the pressure relief valve opens in response to a severe shock and remains closed in response to a mild shock;
a rebound chamber having a volume reducing in response to operation of the suspension unit from the compressed position to the extended position;
gas disposed in the reservoir chamber;
an upper tube;
a damper shaft fixed to the upper tube;
a lower tube receiving at least a portion of the upper tube;
a cartridge tube fixed to the lower tube;
a piston supported by the damper shaft and disposed in the cartridge tube; and
a compression valve operable to dampen flow of the damping fluid through the first path from the compression chamber to the reservoir chamber,
wherein the piston divides a chamber of the cartridge tube into the compression and rebound chambers.

2. The suspension damper of claim 1, wherein the reservoir chamber is defined between the upper and lower tubes and the cartridge tube.

3. The suspension damper of claim 1, wherein the cartridge tube houses the inertia valve, the compression valve, and the pressure relief valve.

4. The suspension damper of claim 3, wherein the cartridge tube houses the reservoir chamber.

5. The suspension damper of claim 1, further comprising a bladder made from a flexible material, disposed in the reservoir chamber, and housing the gas.

6. The suspension damper of claim 1, wherein the acceleration is from the extended position to the compressed position.

7. The suspension damper of claim 6, wherein the inertia valve comprises:
an outer flow tube having first and second flow ports formed through a wall thereof;
an inner flow tube disposed within the outer flow tube so that an annulus is formed therebetween and having a head isolating the first flow port from the annulus;
an inertia mass made from a high density material, having a recess formed therein, and movable between the open and closed positions, wherein the recess provides fluid communication between the first and second flow ports in the open position;
a spring biasing the inertia mass toward the closed position;
a pocket receiving the inertia mass in the open position; and
a check valve allowing flow from the pocket and obstructing flow into the pocket.

8. The suspension damper of claim 1, wherein the pressure relief valve has a bleed providing limited fluid communication between the compression and reservoir chambers in the closed position.

9. The suspension damper of claim 8, wherein the bleed is externally adjustable.

10. The suspension damper of claim 9, further comprising an externally located and hand operable controller operably coupled to the pressure relief valve, wherein operation of the controller adjusts the second threshold and the bleed.

11. The suspension damper of claim 1, further comprising an externally located and hand operable controller operably coupled to the pressure relief valve, wherein operation of the controller adjusts the second threshold.

12. The suspension damper of claim 1, wherein:
the first threshold is operable so that the inertia valve opens in response to a medium shock and remains closed in response to the mild shock, and
the setting of the second threshold is further operable so that the pressure relief valve remains closed in response to the medium shock.

13. A suspension damper operable between a compressed position and an extended position, comprising:
a compression chamber having a volume reducing in response to operation of the suspension unit from the extended position to the compressed position;
a second chamber
damping fluid for flowing between the chambers;
an inertia valve at least substantially closing a first fluid path between the compression and second chambers when in a closed position and movable to an open position in response to an acceleration of at least a portion of the damper, such acceleration equaling or exceeding a first threshold,
a first pressure relief valve at least substantially closing a second fluid path between the compression and second chambers when in a closed position and movable to an open position in response to pressure in the compression chamber equaling or exceeding an externally adjustable second threshold; and
a second pressure relief valve at least substantially closing a third fluid path between the compression and second chambers when in a closed position and movable to an open position in response to pressure in the compression chamber equaling or exceeding a third threshold.

14. The suspension damper of claim 13, further comprising:
- a rebound chamber having a volume reducing in response to operation of the suspension unit from the compressed position to the extended position; and
- gas disposed in the second chamber,
- wherein the second chamber is a reservoir chamber.

15. The suspension damper of claim 14, further comprising:
- a shock absorber housing the compression and rebound chambers; and
- a reservoir tube housing the reservoir chamber, the pressure relief valves, and the inertia valve.

16. The suspension damper of claim 14, further comprising a floating piston disposed in the reservoir chamber and isolating the gas from the damping fluid.

17. The suspension damper of claim 16, wherein the inertia valve comprises:
- a reservoir shaft connected to the reservoir tube and having a flow port formed through a wall thereof.
- an inertia mass made from a high density material and movable between the open and closed positions, wherein the inertia mass covers the flow port in the closed position and exposes the flow port in the open position;
- a spring biasing the inertia mass toward the closed position;
- a pocket receiving the inertia mass in the open position; and
- a check valve allowing flow from the pocket and obstructing flow into the pocket.

18. The suspension damper of claim 17, wherein:
- the second pressure relief valve comprises a base connected to the reservoir shaft and a cap connected to the base,
- the first pressure relief valve comprises:
  - a control shaft connected to the reservoir tube and extending through the floating piston,
  - a seat fastened to the cap;
  - a valve element at least partially received by the control shaft and having a head; and
  - a spring biasing the head toward the seat.

19. A suspension damper operable between a compressed position and an extended position, comprising:
- a compression chamber having a volume reducing in response to operation of the suspension unit from the extended position to the compressed position;
- a second chamber;
- damping fluid for flowing between the chambers;
- an inertia valve at least substantially closing a first fluid path between the compression and second chambers when in a closed position and movable to an open position in response to an acceleration of at least a portion of the damper, such acceleration equaling or exceeding a first threshold, and
- a pressure relief valve at least substantially closing a second fluid path between the compression and second chambers when in a closed position and movable to an open position in response to pressure in the compression chamber equaling or exceeding an externally adjustable second threshold, wherein:
- at least one setting of the second threshold is operable so the pressure relief valve opens in response to a severe shock and remains closed in response to a mild shock,
- the acceleration is from the extended position to the compressed position, and
- the inertia valve comprises:
  - an outer flow tube having first and second flow ports formed through a wall thereof;
  - an inner flow tube disposed within the outer flow tube so that an annulus is formed therebetween and having a head isolating the first flow port from the annulus;
  - an inertia mass made from a high density material, having a recess formed therein, and movable between the open and closed positions, wherein the recess provides fluid communication between the first and second flow ports in the open position;
  - a spring biasing the inertia mass toward the closed position;
  - a pocket receiving the inertia mass in the open position; and
  - a check valve allowing flow from the pocket and obstructing flow into the pocket.

\* \* \* \* \*